United States Patent [19]

Ito

[11] Patent Number: 5,717,949

[45] Date of Patent: Feb. 10, 1998

[54] SYSTEM FOR READING TRANSFER CONTROL PARAMETERS BASED ON IDENTIFICATION CODES STORED IN FIRST AND SECOND REGISTERS STORING DESTINATION IDENTIFICATION AND DESIGNATED CONTROL SECTION IDENTIFICATION DATA

[75] Inventor: Noriko Ito, Kasugai, Japan

[73] Assignee: Fujitsu Limited, Kawasaki, Japan

[21] Appl. No.: 501,303

[22] Filed: Jul. 12, 1995

[30] Foreign Application Priority Data

Jul. 12, 1994 [JP] Japan .................. 6-160377

[51] Int. Cl.$^6$ ............................ G06F 15/02
[52] U.S. Cl. ............................ 395/824
[58] Field of Search ............ 395/821–824, 395/829, 842, 846, 881, 309, 250, 287, 800, 474, 480

[56] References Cited

U.S. PATENT DOCUMENTS

| | | | |
|---|---|---|---|
| 4,897,777 | 1/1990 | Janke et al. | 364/134 |
| 4,965,801 | 10/1990 | DuLac | 371/40.1 |
| 4,992,926 | 2/1991 | Janke et al. | 395/200.06 |
| 5,033,049 | 7/1991 | Keener et al. | 395/183.09 |
| 5,150,465 | 9/1992 | Bush et al. | 395/834 |
| 5,175,822 | 12/1992 | Dison et al. | 395/829 |
| 5,283,872 | 2/1994 | Ohnishi | 395/309 |

FOREIGN PATENT DOCUMENTS

0451516  10/1991  European Pat. Off.

*Primary Examiner*—Moustafa M. Meky
*Attorney, Agent, or Firm*—Staas & Halsey

[57] ABSTRACT

An SCSI controller as an interface device is disclosed. The SCSI controller includes a transfer parameter holder, a data transfer controller and a setting circuit. The transfer parameter holder holds a plural set of data transfer control parameters for data communication between information processing apparatuses and individual internal control sections of a processing apparatus connected to the SCSI controller. A transfer parameter register, provided in the data transfer controller, temporally stores a set of data transfer control parameters used for data communication between its own processing apparatus and any one of other processing apparatuses. The setting circuit selects a set of data transfer control parameters optimum for data communication between a destination processing apparatus and one of the internal control sections designated by the destination apparatus from those in the transfer parameter holder, referring to the identification codes of the destination apparatus as well as the designated internal control section. The setting circuit provides the transfer parameter register with the selected control parameters.

7 Claims, 5 Drawing Sheets

SYSTEM FOR READING TRANSFER CONTROL PARAMETERS BASED ON IDENTIFICATION CODES STORED IN FIRST AND SECOND REGISTERS STORING DESTINATION IDENTIFICATION AND DESIGNATED CONTROL SECTION IDENTIFICATION DATA

BACKGROUND OF THE INVENTION

1. Field of the Invention

The present invention relates generally to a device used as an interface between various components of a data processing system, and particularly, to an interface controller that selects data transfer control parameters between multiple system components based on an identification code specific to each system component.

2. Description of the Related Art

One increasingly popular device used by many of today's computer manufacturers is the small computer system interface (SCSI) controller. The popularity of SCSI devices depends in part on their capacity to handle increased data throughput between various computer system components. In computer systems having multiple components controlled by a single SCSI controller, it is important that when one system component selects a target component for data transfer, the target component should reset its data transfer control using parameters suitable to both components. The controller should manage this in a quick and efficient manner.

Figure 1:
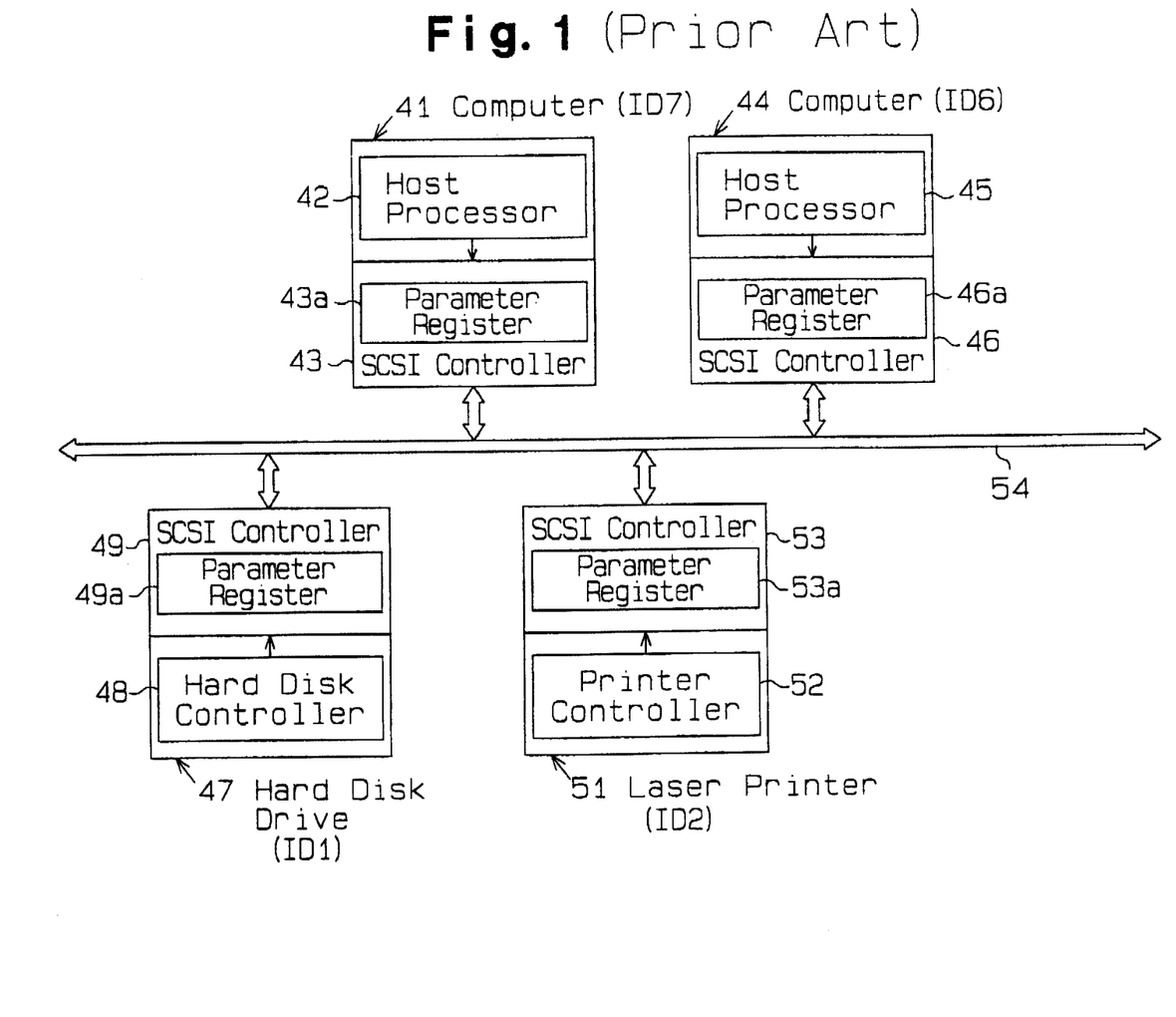
FIG. 1 is a block diagram showing data communication system using conventional small computer system interface (SCSI) controllers.

FIG. 1 illustrates one example of a conventional information processing system. The system includes two personal computers 41 and 44, a hard disk drive 47 and a laser printer 51. Each component is effectively a data processor. The computers 41 and 44 respectively utilize processors 42 and 45, the hard disk drive incorporates a hard disk controller 48 and the printer 51 incorporates a laser printer controller 52. Each processor and controller have a one-to-one correspondence with each data processing apparatus, and each apparatus has a distinct identification code to distinguish it from other apparatuses. For example, the computers 41 and 44 have identification codes ID7 and ID6, the hard disk apparatus 47 has identification code ID1, and the laser printer 51 has identification code ID2.

The computers 41 and 44, hard disk drive 47 and laser printer 51 have small computer system interface (SCSI) controllers 43, 46, 49 and 53, respectively. The individual SCSI controllers 43, 46, 49 and 53 are interconnected by a SCSI bus 54. The individual SCSI controllers 43, 46, 49 and 53 have respective transfer parameter registers 43a, 46a, 49a and 53a. These registers store data transfer control parameters necessary to perform synchronous data transfers. The control parameters include data respecting sync transfer offset, sync transfer period and the length of data to be transferred.

Data transfer between two apparatuses occurs when one of the SCSI devices 43,46,49 or 53 selects one of the data processing apparatuses in the system.

A description will now be given of how the computer 41 having ID code ID7 receives data from the hard disk drive 47 having ID code ID1. The host processor 42 in the computer 41 first provides its own SCSI controller 43 with the identification code ID1 of the disk drive 47. The processor 42 next selects the data transfer control parameters appropriate for communication with the hard disk drive 47 from a plurality of parameters intended to control data transfer among the computer 41, the hard disk drive 47 and the laser printer 51. Once the appropriate parameters are chosen, the processor 42 then provides them to the SCSI controller 43 which registers them in its own transfer parameter register 43a.

In the similar manner, the disk drive controller 48 selects a set of control parameters to manage data transfer between the disk drive 47 and computer 41. The set of parameters are selected entirely from those controlling communication between the hard disk drive 47 and either the computers 41, 44 or the laser printer 51. The controller 48 then provides the SCSI controller 49 with the selected parameters. Next, the SCSI controller 49 registers the control parameters with its own transfer parameter register 49a. The two transfer parameter registers 43a and 49a, thus contain transfer control parameters for data transfer between the computer 41 and the hard disk drive 47. Consequently, both the SCSI controllers 43 and 49 are set to manage data transfer between the hard disk drive 47 and the computer 41.

With conventional data transfer protocol, every time data transfer occurs between two apparatuses, each apparatus must reset its own SCSI controller with parameters suitable for the target apparatus. This means that with each data transfer operation, the SCSI controller must replace the old control parameters, stored in the SCSI's register, with new parameters. Consequently, each time the target apparatus changes, the control parameters must also be reset for the respective apparatuses. The obvious limitation this presents is that as the incidence of data transfer between various apparatuses increases, the time necessary to execute various application functions also increases. This generally limits the rate of data throughput in the computer and lowers the overall performance of the data processing system.

Figure 2:
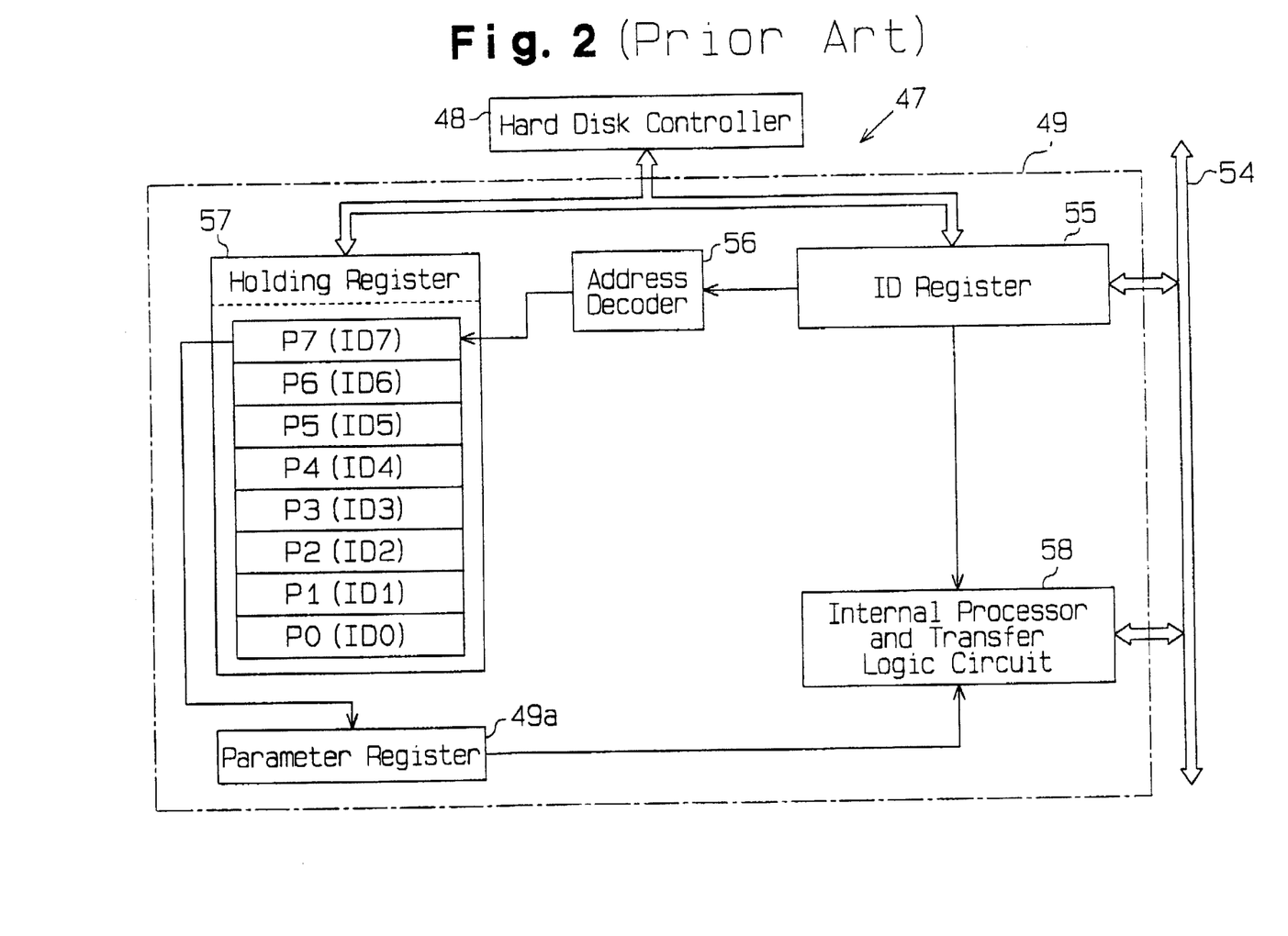
FIG. 2 is a block diagram showing one type of conventional SCSI controllers.

One proposed solution to this problem, is to provide a SCSI controller for each data processing apparatus with a register containing data transfer control parameters designed for specific target apparatuses. The SCSI controller would select its own registered control parameters set for a specific target. An example of the proposed SCSI controller is shown in FIG. 2. The SCSI controller 49 has a transfer parameter resister 49a, an ID register 55, an address decoder 56, a transfer parameter holding register 57 and an internal processor and transfer logic circuit 58.

The ID resister 55 stores an identification code of a destination or target apparatus. The holding register 57 includes memory addresses to store data transfer control parameters corresponding to specific system components. For example, the data transfer control parameters P7 to P0 corresponding to identification codes ID7 to ID0, are input to selected memory address areas in the holding register 57. Memory address input occurs, for example, when the hard disk drive 47 is initially activated, i.e., when the hard drive transfers data to a target device.

The ID register 55, connected to the SCSI bus 54, receives the identification code specific to the destination apparatus when data is initially transferred. For example, when the destination apparatus is the personal computer 41 as shown in FIG. 1, the identification code data ID7 is input to the ID register 55.

The address decoder 56 decodes the identification code data (i.e., ID7) from the ID register 55. The address decoder 56 then accesses any one of the memory areas in the parameter holding register 57 based on the result of the decoding. This allows the transfer parameter register 49a to receive the control parameter (i.e., parameter P7 corresponding to ID7) stored in the accessed memory area.

The internal processor and transfer logic circuit 58 transfers data to the host processor 42 of the destination apparatus 41, shown in FIG. 1, and/or to the hard disk controller 48. This operation requires on the combination of the ID code in the ID register 55, the control parameters in the transfer parameter register 49a, a request signal REQ and an acknowledge signal ACK sent from the target SCSI controller.

When data transfer is reestablished between two apparatuses, the SCSI controller 49, shown in FIG. 2, is able to select data transfer control parameters without depending on the host processor 42. This reduces the work required by the target apparatus, and allows for increased data throughput and transfer efficiency.

For the purpose of designing compact and inexpensive computer components, a new type of interface controller has been proposed that accommodates data transfer among multiple targets having a range of ID codes and that allows control parameters to be selected based on the ID code data designated by the target apparatus. Ideally, such an interface controller could perform multi-target communication in a way that reduces overall system demands and increases data transfer efficiency. If data processing performance of various targets differ, however, different data transfer control parameters would be required. Consequently, the SCSI controller 49 shown in FIG. 2 would not be appropriate choice as a multi-target interface controller. Current data transfer rates for systems using interface controllers with multiple target is as yet unacceptably low, and consequently, inefficient.

SUMMARY OF THE INVENTION

Accordingly, it is a primary objective of the present invention to provide an interface controller performing multi-target communication, which efficiently selects data transfer control parameters that are best for two apparatuses: a destination apparatus and a selected apparatus, and which reduces the burden of parameter setting for at least one of the two apparatuses, improving the data transfer speed between the two apparatuses.

To achieve the foregoing and other objects and in accordance with the purpose of the present invention, an improved interface device is provided, for use in a system for data communication between a plurality of information processing apparatuses incorporated in the system.

The interface device according to the present invention is provided associated with an information processing apparatus having a plurality of internal control sections with distinct identification codes. The interface device includes a transfer parameter holder, a data transfer controller and a setting circuit. The transfer parameter holder holds a plural set of data transfer control parameters for data communication between the individual internal control sections and the plurality of processing apparatuses. The data transfer controller includes a transfer parameter register for temporarily storing a set of data transfer control parameters used for data communication between its own processing apparatus and any one of other processing apparatuses. The setting circuit is coupled to the transfer parameter holder and to the data transfer controller. The setting circuit selects a set of data transfer control parameters optimum for data communication between a destination processing apparatus and one of the plurality of internal control sections designated by the destination apparatus from those in the transfer parameter holder, referring to the identification codes of the destination apparatus as well as the designated internal control section. The setting circuit provides the transfer parameter register with the selected control parameters.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings in which:

DETAILED DESCRIPTION OF THE PREFERRED EMBODIMENTS

An embodiment of the present invention will now be described with reference to FIGS. 3 through 5. FIG. 4 shows an information processing system according to this embodiment. The information processing system has personal computers 1 and 4, a hard disk drive 7 and a laser printer 11, which serve as information processing apparatuses. The computers 1 and 4 and the printer 11 include host processors 2 and 5 and a laser printer controller 12 as information processing control sections, respectively. The hard disk drive 7 has two hard disk controllers 8 and 9 as information processing control sections.

Each apparatus is given identification code, which distinguishes the apparatus from other apparatuses. In this embodiment, the host processors 2 and 5 are given identification codes ID3 and ID4, respectively. The hard disk controllers 8 and 9 are given identification codes ID0 and ID1, and the laser printer controller 12 is given identification data ID2.

The computers 1 and 4, hard disk drive 7 and laser printer 11 have small computer system interface (SCSI) controllers 3, 6, 10 and 13 as interface devices for data transfer control, respectively. The individual SCSI controllers 3, 6, 10 and 13 are mutually connected by a SCSI bus 14. The individual SCSI controllers 3, 6, 10 and 13 have transfer parameter registers 3a, 6a, 10a and 13a as parameter storage sections, respectively. Each of the transfer parameter registers 3a, 6a, 10a and 13a stores data transfer control parameters necessary for synchronous data transfer operation. The control parameters includes parameters indicating a sync transfer offset, a sync transfer period and a length of data to be transferred.

In data transfer between two apparatuses in the system, the host processors 2 and 5 serve as destination apparatuses (i.e., initiators), while the two hard disk controllers 8 and 9 and the laser printer controller 12 serve as apparatuses to be selected (i.e., targets). In data communication between two apparatuses, only one initiator acquires the right to use the SCSI bus 14. The initiator that has acquired the using right outputs the ID code data of its own and the ID code data of a selected apparatus, to the SCSI bus 14 from the SCSI controller associated with the initiator. As an apparatus to be selected receives data of those ID codes, two apparatuses involved in data transfer are determined. Thereafter, the transfer parameter registers of the SCSI controllers of the initiator and target apparatuses are set to have data transfer control parameters that are suitable for the two apparatuses. Thus, data transfer between the two apparatuses is executed, based on the set control parameters, by using the associated SCSI controllers.

In this embodiment, when the first data transfer is performed between two apparatuses, transfer parameters are input to the transfer parameter registers 3a, 6a and 13a of the SCSI controllers 3, 6 and 13, by the host processors 2 and 5 and the printer controller 12. In the second and subsequent data transfers between the two apparatuses Which has already completed data transfer, the SCSI controllers 3, 6, and 13 set proper transfer parameters to the associated parameter registers 3a, 6a and 13a by themselves. The SCSI controllers 3, 6 and 13 execute data transfer based on the transfer parameters stored in the respective transfer parameter registers 3a, 6a and 13a.

The SCSI controller 10 only is provided for a plurality of hard disk controllers (two controllers 8 and 9, in this embodiment) to execute multi-target data communication. When one of the hard disk controllers 8 and 9 is selected by an initiator to execute the first data transfer, proper transfer parameters are input to the transfer parameter register 10a of the SCSI controller 10 by either the hard disk controller 8 or 9. In the second and subsequent data transfers, the SCSI controller 10 itself sets transfer parameters to the transfer parameter register 10a.

Figure 3:
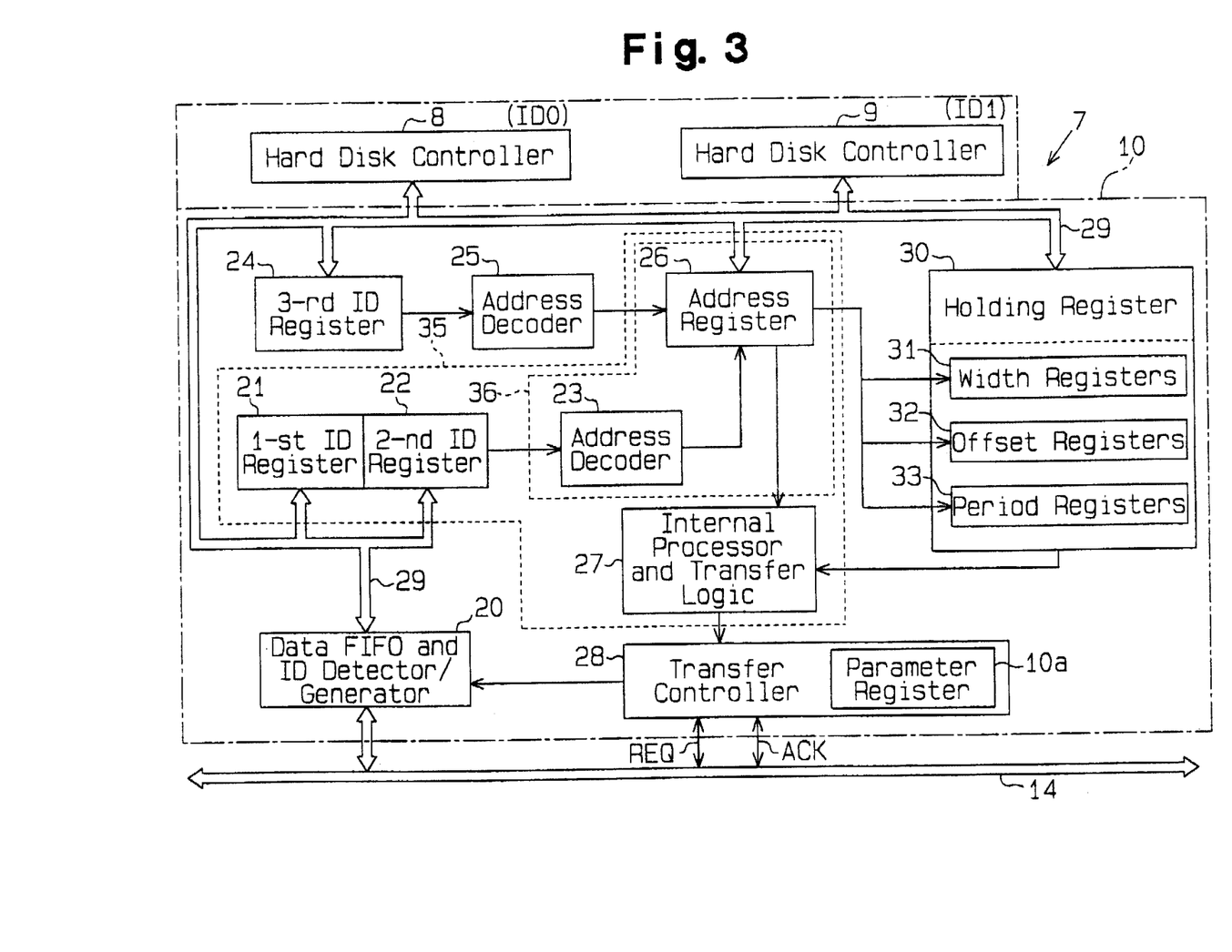
FIG. 3 is a block diagram showing a SCSI controller according to an embodiment of the present invention.
Figure 4:
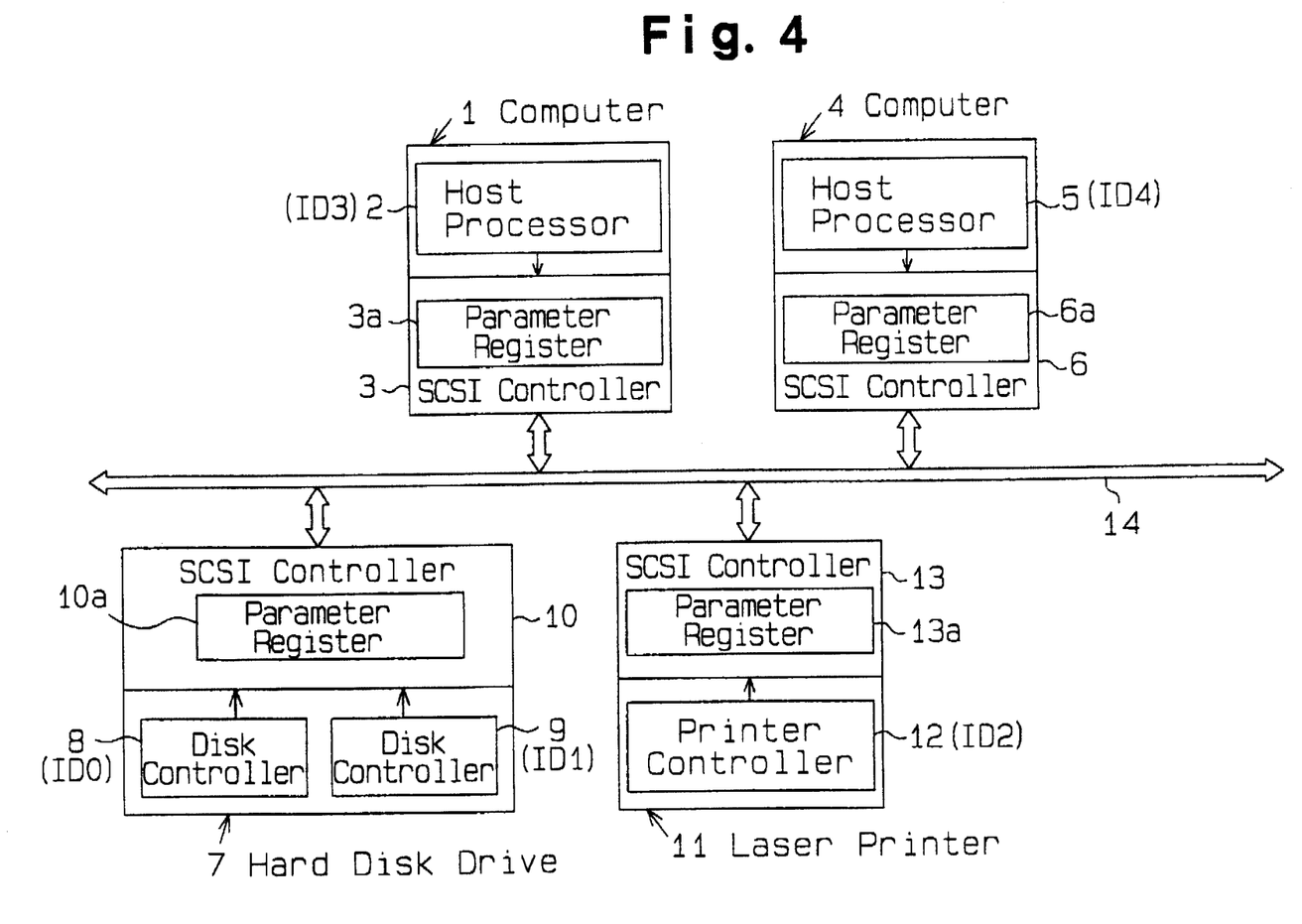
FIG. 4 is a block diagram showing data communication system using the SCSI controller of FIG. 3.

Referring to FIG. 3, the detail structure of the SCSI controller 10 of this embodiment will now be described. The SCSI controller 10 comprises a data first-in-first-out (FIFO) and ID detector/generator 20 (hereinafter simply referred to as data FIFO 20), a setting circuit 35 including first and second ID resisters 21 and 22, a third ID register 24, an address decoder 25, a transfer parameter holding register 30 and a transfer controller 28. The transfer controller 28 has the transfer parameter register 10a.

The data FIFO 20 and the transfer controller 28 are connected to the SCSI bus 14. The data FIFO 20, the setting circuit 35, the third ID register 24, the transfer parameter holding register 30 and the two hard disk controllers 8 and 9 are mutually connected by an MPU bus 29.

The transfer controller 28 controls the data FIFO 20 for data sending and data reception, based on the transfer parameters stored in the transfer parameter register 10a, in response to a request signal REQ and an acknowledge signal ACK with the SCSI controller of a destination apparatus.

During data transfer operation, the data FIFO 20 receives the ID code data of a destination apparatus or initiator as well as the ID code data of a target apparatus to be selected, via the SCSI bus 14, and outputs the received data to the MPU bus 29. In a data transmission mode, the data FIFO 20 receives transmission data to be transmitted, from either the hard disk controller 8 or 9 via the MPU bus 29. In response to a control signal output from the transfer controller 28, the data FIFO 20 outputs the transmission data to the SCSI bus 14 in the input order. In a data reception mode, the data FIFO 20 receives data sent thereto via the SCSI bus 14 in response to a control signal output from the transfer controller 28. The data FIFO 20 outputs the received data to either the hard disk controller 8 or 9 via the MPU bus 29, in the input order.

The transfer parameter holding register 30 previously stores data transfer control parameters used for the data communication between an destination apparatus or initiator and an apparatus that may be selected by the initiator. The transfer parameters are input to the holding register 30 by the hard disk controller 8 or 9, for example, when the hard disk controller is activated, or at the time of the first data transfer between the hard disk controller and a destination apparatus.

The transfer parameter holding register 30 includes a group of transfer width registers 31, a group of transfer offset registers 32 and a group of transfer period registers 33. As shown in FIG. 5, the transfer width registers 31 include a plurality of registers 31a (h registers in this embodiment) serving as memory areas. The individual registers 31a are given different addresses respectively, and store parameters P1 to Ph respecting a length of data to be transferred. The transfer offset registers 32 includes a plurality of registers 32a (i registers in this embodiment) serving as memory areas. The individual registers 32a are given different addresses respectively, and store parameters Q1 to Qi respecting data transfer offset. The transfer period registers 33 includes a plurality of registers 33a (j registers in this embodiment) serving as memory areas. The individual registers 33a are given different addresses respectively, and store parameters R1 to Rj respecting data transfer period.

The setting circuit 35 includes a selector 36, an internal processor and transfer logic circuit 27 (hereinafter simply referred to as internal processor 27) as well as the first and second ID registers 21 and 22. The selector 36 includes an address decoder 23 and an address register 26, and selects one of the memory areas in the transfer parameter holding register 30. When an apparatus to be selected is specified by a destination apparatus, the setting circuit 35 selects data transfer control parameters that are suitable for the destination apparatus in association with the selected ID code, referring to the ID code data of the destination apparatus and the ID code data of the selected apparatus, from the transfer parameter holding register 30. The setting circuit 35 provides the selected control parameters for the transfer parameter register 10a.

The first and second ID registers 21 and 22 and the address register 26 are connected to the MPU bus 29. The first ID register 21 detects the ID code of the destination apparatus from the received data of the data FIFO 20, and stores the ID data of the destination apparatus. The second ID register 22 detects the ID code of the selected apparatus from the received data of the data FIFO 20, and stores that ID code data.

Figure 5:
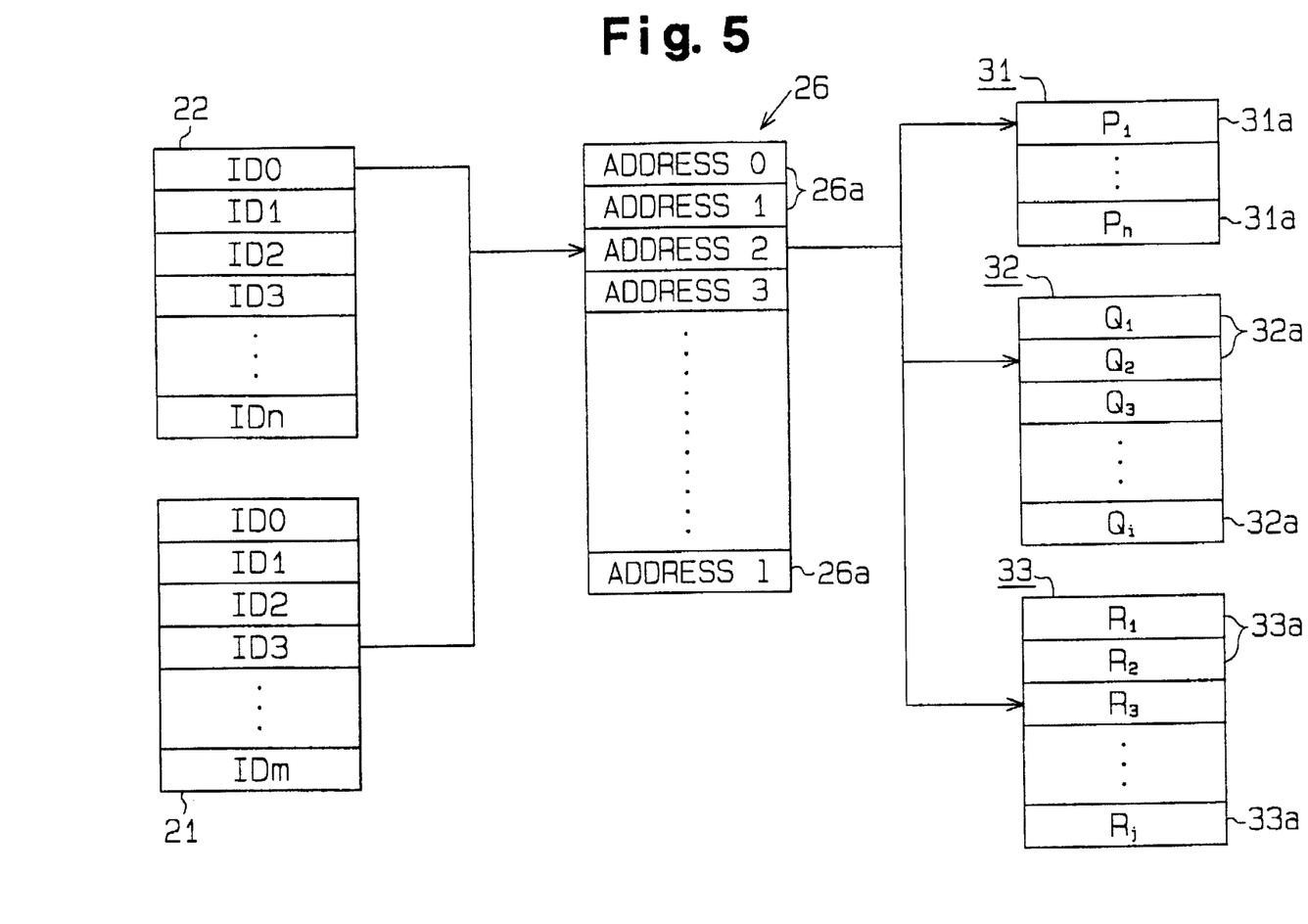
FIG. 5 is an explanatory diagram showing the relationship between an address register and a transfer parameter holding register shown in FIG. 3.

As shown in FIG. 5, the address register 26 has a plurality of segment registers 26a (l registers in this embodiment) as memory areas. The individual segment registers 26a are given different addresses, respectively. Each segment register 26a stores address data used for selecting one from among the transfer width registers 31a, one from among the transfer offset registers 32a, and one from among the transfer period registers 33a. The address data is input to the register 26 by the hard disk controller 8 or 9, for example, when the hard disk controller 8 or 9 is activated, or at the time of the first data transfer between the hard disk controller and a destination apparatus.

The address decoder 23 decodes the ID code data stored in the first and second ID registers 21 and 22. In accordance with the decoding result, the address decoder 23 selects one of the registers 26a in the address register 26. For different combinations of destination apparatuses and selected apparatuses, the decoding results for the individual combinations all differ from one another. Accordingly, the decoding results are associated one to one with the individual registers 26a of the address register 26.

When the hard disk controller 8 is selected by the computer 1 as an initiator for data transfer operation, for example as shown in FIG. 5, the ID code ID3 of the computer 1 is stored in the first ID register 21 of the SCSI controller 10 and the ID code ID0 of the disk controller 8 is stored in the second ID register 22. When the ID codes ID3 and ID0 in the respective registers 21 and 22 are decoded by the address decoder 23, a third segment register 26a in the address register 26 is selected based on the result of decoding. Then, the address data "ADDRESS 2" stored in the third segment register 26a is output to the registers 31 to 33. Based on the data "ADDRESS 2", the first register 31a, having stored the parameter P1 indicative of the length of data to be transferred, is selected from the group of transfer width registers 31. Likewise, the second register 32a, having stored the parameter Q2 indicative of transfer offset, is selected from the group of transfer offset registers 32. Further, the third register 33a, having stored the parameter R3 indicative of data transfer period, is selected from the group of transfer period registers 33.

The internal processor and transfer logic circuit 27 reads the transfer length, transfer offset and transfer period parameters from the registers 31a, 32a and 33a selected based on the address data from the address register 26. The read transfer parameters are written into the transfer parameter register 10a by the internal processor 27.

In the first data transfer operation between the destination apparatus and the selected apparatus, the third ID register 24 and the address decoder 25 previously stores transfer parameters in the transfer parameter holding register 30, and previously stores address data in the address register 26.

The third ID register 24 stores the ID code of a destination apparatus stored in the first ID register 21 and the ID code of a selected apparatus stored in the second ID register 22.

The address decoder 25 decodes the two ID codes stored in the ID register 24, and selects one of the memory areas in the address register 26 in accordance with the result of decoding. At this time, the disk controller selected from the two hard disk controllers 8 and 9 provides the selected memory area of the address register 26 with address data used to specify some of the resistors in the transfer parameter holding register 30. The selected disk controller stores the transfer length, transfer offset and transfer period parameters into the registers 31a, 32a and 33a identified by the address data.

When the hard disk controller 8 is selected by the computer 1 as an initiator for data transfer operation, for example, the ID codes ID3 and ID0 are stored in the third ID register 24. The ID code data ID3 and ID0 in the register 24 are decoded by the address decoder 23. Then, the third register 26a of the address register 26 is selected so that address data "ADDRESS 2" is stored in the third register 26a. The transfer length parameter P1 is stored in the first register 31a of the transfer width register group 31, which corresponds to the data "ADDRESS 2". The transfer offset parameter Q2 is stored in the second register 32a of the transfer offset register group 32. The transfer period parameter R3 is stored in the third register 33a of the transfer period register group 33.

At the time of the activation of the hard disk controllers 8 and 9, or at the time of the first data transfer between the disk controller 8 or 9 and a destination apparatus, the transfer parameter holding register 30 can store all transfer parameters by performing the above-described operations for all the destination apparatuses connected to the disk controllers 8 and 9.

According to the SCSI controller 10 of this embodiment, when a destination apparatus designates one of the two hard disk controllers 8 and 9, the ID code data of the destination apparatus and the ID code data of the selected controller are stored in the first and second ID registers 21 and 22, respectively. The two ID code data in the registers 21 and 22 are decoded by the address decoder 23, so that one segment register 26a in the address register 26 is selected based on the result of decoding. Referring to the address data stored in the selected segment register 26a, registers 31a, 32a and 33a are selected from the transfer width register group 31, the transfer offset register group 32 and the transfer period register group 33, respectively. The parameters stored in the selected registers 31a, 32a and 33a are provided to the internal processor 27 and are written in the transfer parameter register 10a of the transfer controller 28.

Then, the transfer controller 28 controls the data FIFO 20 to perform data transmission and data reception, based on the parameters stored in the transfer parameter register 10a and on a request signal REQ and an acknowledge signal ACK with the SCSI controller of the destination apparatus.

In the SCSI controller 10 of this embodiment, the data transfer control parameters that are suitable for the data communication between a destination apparatus and the hard disk controller 8 and 9 are stored in the transfer parameter holding register 30. When one of the hard disk controllers 8 and 9 is designated by the destination apparatus thereafter, the internal processor 27 read the control parameters for the selected disk controller, from the holding register 30, referring to the address data stored in address register 26, and set the read control parameters in the transfer parameter register 10a. This relieves the hard disk controllers 8 and 9 of the process of setting data transfer control parameters for each data transfer, thus reducing the burden on the individual hard disk controllers 8 and 9 to improve the data transfer efficiency.

Further, the SCSI controller 10 according to this embodiment includes the address register 26 for storing address data used to select one of the registers provided in the transfer parameter holding register 30. When data transfer control parameters do not change regardless of the change in combinations of the destination apparatus and selected apparatus, the registers 26a in the address register 26 maintain the same address data. This reduces the number of registers in the individual register groups 31, 32 and 33 in the transfer parameter holding register 30, so that the holding register 30 becomes compact. In general, as the number of apparatuses to be connected to the SCSI bus 14 increases, the number of registers in the transfer parameter holding register 30 increases. Therefore, the design according to this embodiment is advantage for reducing the package of SCSI controller.

According to this embodiment, at the time of the first data transfer between a destination apparatus and a selected apparatus, the third ID register 24 stores the ID code of the destination apparatus, stored in the first ID register 21, and the ID code of the selected apparatus, Stored in the second ID register 22. Even when the data stored in the first and second ID registers 21 and 22 are changed during the setting of transfer control parameters in the holding register 30, the two ID codes in the third ID register 24 are not changed. Therefore, there is no change in the registers selected in the transfer parameter holding register 30. This allows data transfer control parameters to be surely stored in the selected registers.

In this embodiment, the hard disk drive 7 has a plurality of hard disk controllers 8 and 9 (two disk controllers in this embodiment) and one SCSI controller 10. This reduces the manufacturing cost of hard disk drive, and makes the hard disk drive compact, as compared with the conventional design having two hard disk drives, each drive having a single disk controller and a single SCSI controller. Further, since the constructed information processing system includes the hard disk drive 7 performing a multi-target data communication, the scale of overall system can be reduced.

Although only one embodiment of the present invention has been described herein, it should be apparent to those skilled in the art that the present invention may be embodied in many other specific forms without departing from the spirit or scope of the invention. Particularly, it should be understood that the present invention may be modified in the following forms.

With the address register 26 omitted, some of the memory areas in the transfer width register group 31, transfer offset register group 32 and transfer period register group 33 may be selected, based on the decode signals from the address decoders 23 and 25. In this case, three registers are needed to store data transfer control parameters that are suitable for the data communication between a destination apparatus and a selected apparatus. As the number of apparatuses to be connected to the SCSI bus 14 increases, the package of the transfer parameter holding register 30 may increase. Besides the increase of package, this modification has the same function and advantages as the above-described embodiment.

The present invention may be applied to a SCSI controller performing multi-target data communication with respect to an apparatus having three or more targets, each target having an identification code.

In this specification, transfer parameter holding register means the parameter storage means for previously storing data transfer control parameters, and includes not only registers of flip-flop circuit configuration but also semiconductor memories such as a random access memory (RAM).

Therefore, the present examples and embodiments are to be considered as illustrative and not restrictive and the invention is not to be limited to the details given herein, but may be modified within the scope of the appended claims.

What is claimed is:

1. An interface device for use in a system for data communication between a plurality of information processing apparatuses incorporated in the system, said interface device associated with an information processing apparatus having a plurality of internal control sections with distinct identification codes, said interface device comprising:

a transfer parameter holder for holding in memory areas plural sets of data transfer control parameters for data communication between individual internal control sections and said plurality of processing apparatuses;

a data transfer controller including a transfer parameter register for temporarily storing a designated set of data transfer control parameters used for data communication between said interface device and any one of said information processing apparatuses;

a first ID register for receiving and storing identification code data of a destination apparatus;

a second ID register for receiving and storing data of the identification code data of a designated internal control section designated by the destination apparatus;

a selector, coupled to said first and second ID registers, for specifying a portion of the memory areas of said transfer parameter holder, based on the identification codes stored in said first and second ID registers; and a circuit, coupled to said selector and transfer parameter holder, for reading one of the sets of the data transfer control parameters from the portion of the memory areas of said transfer parameter holder selected by said selector, and for transferring the one of the sets of the transfer control parameters to said transfer parameter register.

2. The interface device according to claim 1, wherein said selector includes:

an address register having a plurality of memory areas for storing address data used for selecting the portion of the memory areas in said transfer parameter holder; and a first address decoder, coupled to said address register, for decoding the identification code data of said first and second ID registers and for selecting one of the memory areas in said address register in accordance with the result of the decoding.

3. The interface device according to claim 2, further comprising:

a third ID register for receiving the identification code data from said first and second ID registers and to store the received identification code data; and a second address decoder, coupled to said third ID register, for decoding the identification code data from said third ID register and for specifying one of the memory areas of said address register, based on the result of the decoding, where at a time of first data transfer between the destination apparatus and said designated internal control section, address data is provided, by said designated internal control section, to the one of the memory areas of said address resister specified by said second address decoder, and the designated set of data transfer control parameters is provided, by said designated internal control section, to the portion of the memory areas of said transfer parameter holder selected based on the address data.

4. An information processing system including at least one interface device as recited in claim 1.

5. An information processing system comprising:

a plurality of information processing apparatuses having different identification codes;

interface devices, one of said interface devices provided in each information processing apparatus for managing data transfer between the information processing apparatuses; and a data bus connecting said interface devices, where at least one of said interface devices is the interface device as recited in claim 1.

6. A method of transferring data between a plurality of information processing apparatuses, at least one of the information processing apparatuses including a plurality of internal control sections with distinct identification codes, the method comprising:

using a system interface device coupled to a processing apparatus including the plurality of internal control sections, said system interface device having a transfer parameter holder;

storing plural sets of data transfer control parameters for data communication between the individual internal control sections and said plurality of information processing apparatuses, to said transfer parameter holder, before data transfer starts;

selecting from said transfer parameter holder, when a destination apparatus included among the information processing apparatuses designates a designated internal control section among said internal control sections, a set of data transfer control parameters optimum for data communication between the destination apparatus and the designated internal control section, by referring to identification codes of the destination apparatus as well as the designated internal control section; and executing a data transfer operation between the destination apparatus and the designated internal control section, in accordance with the set of data transfer control parameters selected for optimum data communication.

7. A multiple target interface controller in a computer system having a plurality of destination devices mutually coupled by an input/output bus and at least one multiple target device having a plurality of internal controllers, said multiple target interface controller interfacing the multiple target device to the input/output bus for transferring data, said multiple target interface controller comprising:

a holding register for holding a plurality of transfer parameters, each parameter indicating optimal communications between one of the internal controllers of the multiple target device and one of the destination devices;

a transfer controller, including a transfer parameter register, for controlling transfer of data between one of the internal controllers of the multiple target device and one of the destination devices via the input/output bus based on contents of said transfer parameter register; and a setting circuit, coupled to said holding register and said transfer controller, including a first identification register for receiving and storing an identifier of said destination device, a second identification register for receiving and storing an identifier of one of said internal controllers, said setting circuit setting said transfer parameter register based on the contents of said first identification register and said second identification register.

* * * * *